US011341992B1

(12) United States Patent
Jain et al.

(10) Patent No.: US 11,341,992 B1
(45) Date of Patent: May 24, 2022

(54) MULTIPLE PATH OPTICAL ISOLATOR IN HEAT-ASSISTED MAGNETIC RECORDING DEVICE

(71) Applicant: Seagate Technology LLC, Fremont, CA (US)

(72) Inventors: Aditya Jain, Minneapolis, MN (US); Zoran Jandric, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/170,420

(22) Filed: Feb. 8, 2021

(51) Int. Cl.
*G11B 11/105* (2006.01)
*G11B 5/48* (2006.01)
*G11B 20/10* (2006.01)
*G11B 5/00* (2006.01)
*G11B 7/126* (2012.01)

(52) U.S. Cl.
CPC ...... *G11B 5/4866* (2013.01); *G11B 20/10222* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| 8,358,565 | B2 * | 1/2013 | Komura | G11B 5/314 369/13.33 |
| 8,670,295 | B1 * | 3/2014 | Hu | G11B 5/105 369/13.33 |
| 8,842,506 | B1 * | 9/2014 | Matsumoto | G11B 5/6088 369/13.33 |
| 8,908,481 | B1 | 12/2014 | Miyamoto | |
| 9,036,456 | B2 | 5/2015 | Kasuya et al. | |
| 9,065,572 | B1 | 6/2015 | Wach | |
| 9,418,691 | B2 | 8/2016 | Peng et al. | |
| 9,588,292 | B2 | 3/2017 | Yu et al. | |
| 10,014,016 | B1 * | 7/2018 | Mehfuz | G11B 5/314 369/13.33 |
| 10,036,851 | B1 * | 7/2018 | Peng | G11B 5/6088 369/13.33 |
| 10,061,082 | B1 * | 8/2018 | Peng | H01S 3/063 369/13.33 |
| 11,069,376 | B1 * | 7/2021 | McGurk | G02B 6/1226 369/13.33 |
| 11,120,824 | B1 * | 9/2021 | Peng | G11B 5/6005 369/13.33 |

(Continued)

OTHER PUBLICATIONS

Chen et al., "Electrically pumped continuous-wave 1.3 um InAs/GaAs quantum dot lasers monolithically grown on on-axis Si (001) substrates", Optics Express, vol. 25, No. 5, Mar. 6, 2017, 4632-4639.

(Continued)

*Primary Examiner* — Tan X Dinh
(74) *Attorney, Agent, or Firm* — Mueting Raasch Group

(57) ABSTRACT

An optical isolator has a first optical property with respect to transmitted components of the light traveling towards a target and a second optical property with respect to reflected components of the light traveling towards the laser. The second optical property suppresses the reflected components of the light. The optical isolator can be used in applications such as heat-assisted magnetic recording and LIDAR.

20 Claims, 7 Drawing Sheets

(56) References Cited

U.S. PATENT DOCUMENTS

| | | | | |
|---|---|---|---|---|
| 2003/0002127 | A1* | 1/2003 | George | G02B 6/274 369/13.33 |
| 2011/0038235 | A1* | 2/2011 | Matsumoto | G11B 5/105 369/13.33 |
| 2012/0092971 | A1* | 4/2012 | Schreck | G11B 5/105 369/13.33 |
| 2012/0155232 | A1* | 6/2012 | Schreck | G11B 5/314 369/13.33 |
| 2014/0133283 | A1* | 5/2014 | Maletzky | G11B 5/6088 369/13.33 |
| 2014/0355401 | A1* | 12/2014 | Huang | G11B 5/105 369/13.33 |
| 2015/0146507 | A1* | 5/2015 | Boone, Jr. | G11B 5/314 369/13.32 |
| 2015/0295384 | A1* | 10/2015 | Tatah | G11B 7/1384 369/13.33 |
| 2015/0340051 | A1* | 11/2015 | Tatah | G11B 5/4866 369/13.33 |
| 2016/0284372 | A1* | 9/2016 | Duda | G11B 11/14 369/13.33 |

OTHER PUBLICATIONS

Doerr et al., "Silicon photonics broadband modulation-based isolator", Optics Express, vol. 22, No. 4, Feb. 24, 2014, pp. 4493-4498.

Duan et al., "1.3-um Reflection Insensitive InAs/GaAs Quantum Dot Lasers Directly Grown on Silicon", IEEE Photonics Technology Letters, vol. 31, No. 5, March 1, 29109, pp. 345-348.

Guomi et al., "Giant Faraday Rotation of Ce-Substituted YIG Films Epitaxially Grown by RF Sputtering", Jpn. J. Appl. Phys. vol. 27, Part 2, No. 8.

Huang et al., "Analysis of the optical feedback dynamics in INAs/GaAs quantum dot laser directly grown on silicon", Journal of the Optical Society of America, Oct. 2018, pp. 2780-2787.

Liu et al., "Electrically pumped continuous-wave 13 um quantum-dot lasers epitaxially grown on on-axis (001) GaP/Si", Optics Letters, vol. 42 , No. 2, Jan. 2017.

Tao et al., "Athermal 4-channel (De-)multiplexer in silicon nitride fabricated at low temperature", Photonics Research, Jul. 2018, pp. 686-691.

* cited by examiner

Section A-A

Section B-B

MULTIPLE PATH OPTICAL ISOLATOR IN HEAT-ASSISTED MAGNETIC RECORDING DEVICE

SUMMARY

The present disclosure is directed to an optical isolator. In one embodiment, a recording head includes a laser that outputs light used to heat a recording medium. The recording head includes a near-field transducer proximate a media facing surface that receives the light and emits surface plasmons to the recording medium in response. An optical isolator is between the laser and the near-field transducer. The optical isolator has a first optical property with respect to transmitted components of the light traveling towards the recording medium and a second optical property with respect to reflected components of the light traveling towards the laser. The second optical property suppresses the reflected components of the light.

In another embodiment, a heat-assisted recording head includes a laser that outputs light used to heat a recording medium. A near-field transducer is proximate a media facing surface that receives the light and emits surface plasmons to the recording medium in response. An optical isolator is between the laser and the near-field transducer. The optical isolator has two or more paths that are coupled via a splitter at an input end and a combiner at an output end. The two or more paths cause constructive light interference in a forward direction towards the near-field transducer and destructive light interference in a backward direction towards the laser. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
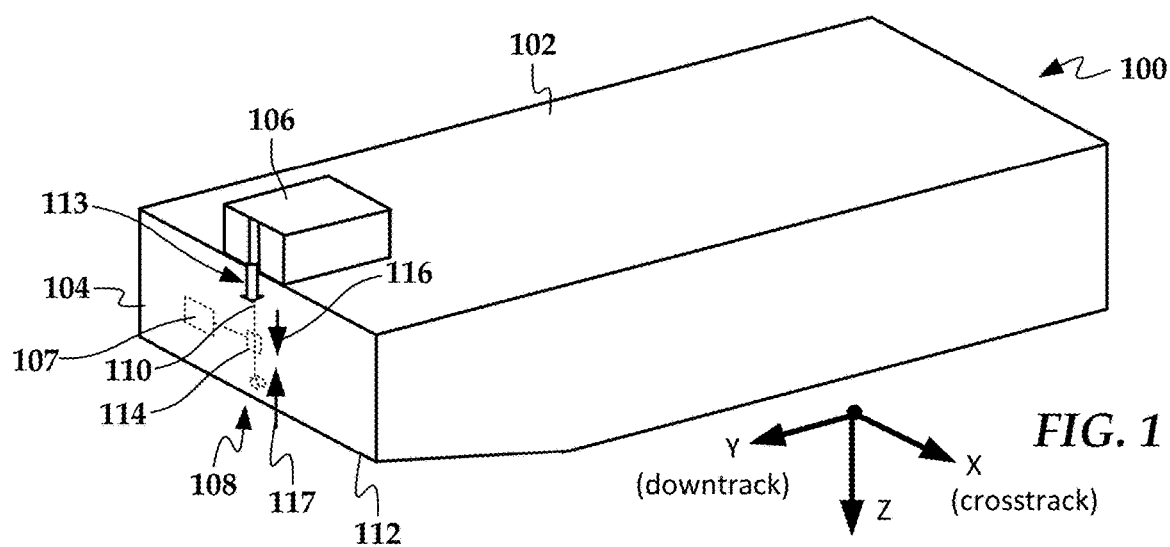
FIGS. 1 and 2 are perspective and cross-sectional views of a recording head according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a sub-100 nm scale optical spot in a recording layer, which raises the media temperature locally, reducing the writing magnetic field required for high-density recording. A waveguide delivers light to and excites the NFT.

The optical energy provided for HAMR recording can be generated by a laser diode that is optically coupled to a slider. The slider includes magnetic writing components such as write coil, write pole, return poles, etc. The laser diode can be mounted to or integrated within the slider (e.g., on a top surface or trailing edge) where an integrated wavelength is coupled to receive light emitted from the slider. The waveguide delivers the light to the NFT, which directs optical energy to the recording medium.

Not all of the optical energy reaching the recording medium is absorbed as heat. Some of the light reflects back from the recording medium into the slider, some of it being coupled back into the laser. Further, there are other sources of internal reflection in the slider that can also cause light to be fed back into the laser. Reflections on the order of −10 dB or more into the laser can cause instability inside the laser. This instability can cause issues such as higher noise or mode hopping in the mode profile of the laser light source. The mode hopping can leading to power jumps in laser output that can jeopardize HAMR writing (e.g., can overwrite adjacent tracks) and can erode the areal density that can be realized in the storage.

Embodiments described below include integrated optical features that can reduce reflections back to the light source. While these embodiments are described in terms of HAMR recording, recording heads, these embodiments may be used in other technological applications. For example, high reflections can degrade the laser relative intensity noise, which are parameters for measuring performance of silicon photonic LIDAR, optical telecommunication transceivers, etc.

In some embodiments, a high isolation (e.g., >30 dB) non-reciprocal device prevent backs reflections into the laser while allowing light to propagate away from the laser to its target, e.g., an NFT for HAMR recording. High isolation is achievable when light interferes constructively in forward direction while destructive interference occurs in the backward direction. In one embodiment, an integrated Mach Zehnder Interferometer can be coated with magneto-optic (MO) material to break the reciprocity in forward and backward direction for HAMR. In another embodiment, a plurality of (e.g., four) connected phase shifters can be modulated by phase shifted signals. High isolation is achievable when correct modulation amplitude and frequency are chosen. In other embodiments, a quantum dot laser can be used to minimize the effect of reflections, either with or without an isolator.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

The energy source 106 outputs light 113 used to heat a recording medium. An optical isolator 114 is shown integrated into the recording head 100, e.g., being optically coupled to the waveguide 110. The optical isolator 114 has a first optical property with respect to transmitted components 116 of the light traveling towards the recording medium and a second optical property with respect to reflected components 117 of the light traveling towards the energy source 106. The second optical property, suppresses the reflected components 117 of the light, thereby reducing stray light that can cause instability in the energy source 106.

The arrangement shown in FIG. 1 has the energy source 106 externally mounted to the slider body 102, either directly or via a submount (not shown). Generally, the energy source 106 in such an arrangement is formed by a process that is incompatible with growth on the slider body, e.g., epitaxial growth. The energy source 106 can formed in a separate process and then bonded (e.g., soldered) to the outer surface of the slider body 102 after fabrication of the slider body 102. In other embodiments, a laser diode or other energy source may be formed via a different process than the slider body 102, but be attached during fabrication of the slider body 102, e.g., via transfer printing of non-self-supporting layers of the epitaxial materials to the substrate. The attachment of the non-self-supporting layers is followed by subsequent slider fabrication steps (e.g., material deposition, photolithography) to integrate the self-supporting layers in the slider body 102, e.g., at the trailing edge 104. This alternate fabrication technique is indicated by region 107 in FIG. 1, which represents an alternate energy source, e.g., a transfer printed laser diode.

Figure 2:
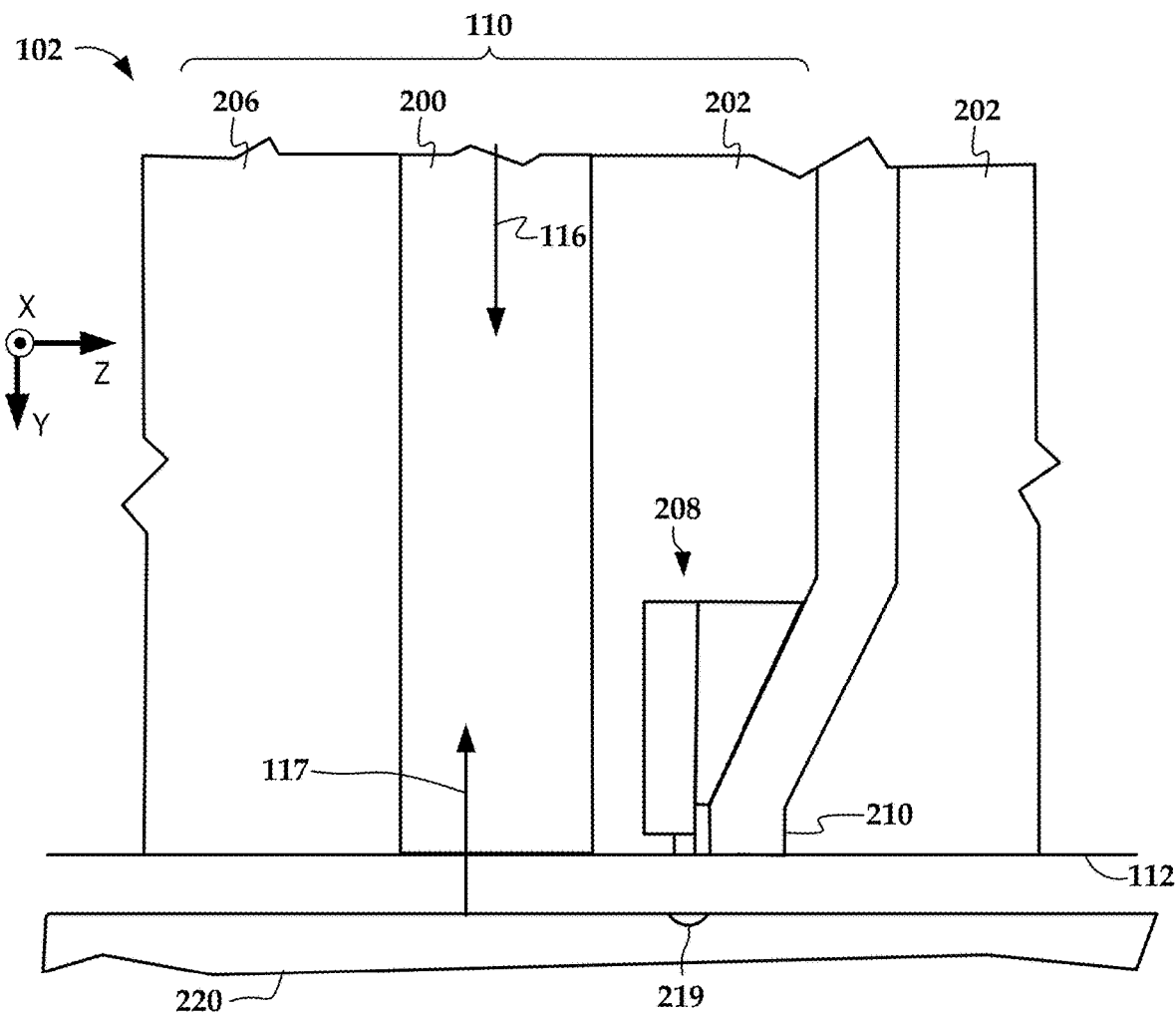

In FIG. 2, a cross-sectional view shows details of a slider body 102 according to an example embodiment. The waveguide 110 includes a core 200, top cladding layer 202 and bottom cladding 206. Other cladding layers not shown in this figure may be used with this waveguide 110, such as middle and side cladding. The core 200 delivers light to an NFT 208 that is located at the media-facing surface 112.

A write pole 210 (also referred to herein as a "magnetic pole") is located near the NFT 208. A magnetic coil (not shown) induces a magnetic field through the write pole 210 in response to an applied current. During recording, the waveguide 110 delivers the transmitted component 116 of the light from the energy source to the NFT 208. The NFT 208 resonates in response to being illuminated, causing the formation of surface plasmons on its outer surface. The NFT 208 is shaped to direct the surface plasmons out of the media-facing surface 112 to form a hotspot 219 within a recording layer of a moving recording medium 220. The write pole 210 applies a magnetic field to the recording medium 220, which sets a magnetic orientation in the hotspot 219, thereby writing data to the recording medium 220.

The reflected component 117 of the light is also shown in this view, and this component 117 can propagate through the core 200 (and other optical components) back to the energy source. Note that the reflected component 117 is shown originating from the recording medium 220, however there are numerous interfaces inside and outside the slider body 102 from which the reflected component 117 of the light can originate in addition to the recording medium 220.

Figure 3:
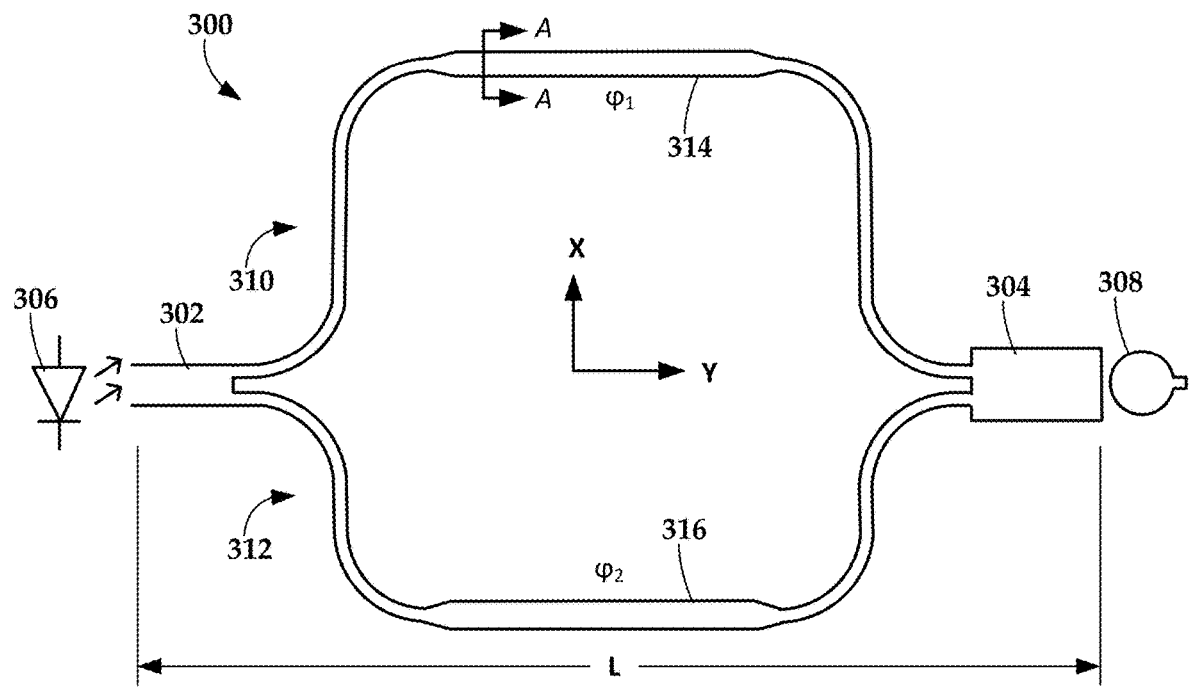
FIG. 3 is a substrate-parallel-plane view of an optical isolator according to an example embodiment.

In FIG. 3, a diagram shows features of an optical isolator 300 according to an example embodiment that is formed on a substrate parallel plane (xy-plane). The optical isolator 300 in this example can be used in any type of slider arrangement, however may be best suited to a transfer printed laser (see, e.g., region 107 in FIG. 1). The optical isolator 300 includes an input coupler 302 and an output coupler 304 that respectively couple the optical isolator 300 to a laser diode 306 and an NFT 308. The optical isolator 300 has two waveguide branches 310, 312 each with a phase shifter 314, 316. The phase shifters 314, 316 are non-reciprocal phase shifters (NRPS) which use a magneto-optical (MO) material which causes the forward and backward propagating waves to have slightly different propagation constants. The phase shifters 314, 316 utilize the Voigt effect, which is an MO phenomenon in which different circular polarization components of linearly polarized light acquire different phase shifts in a magnetized medium. This arrangement is also referred to as a Mach-Zehnder interferometer (MZI).

Figure 4:
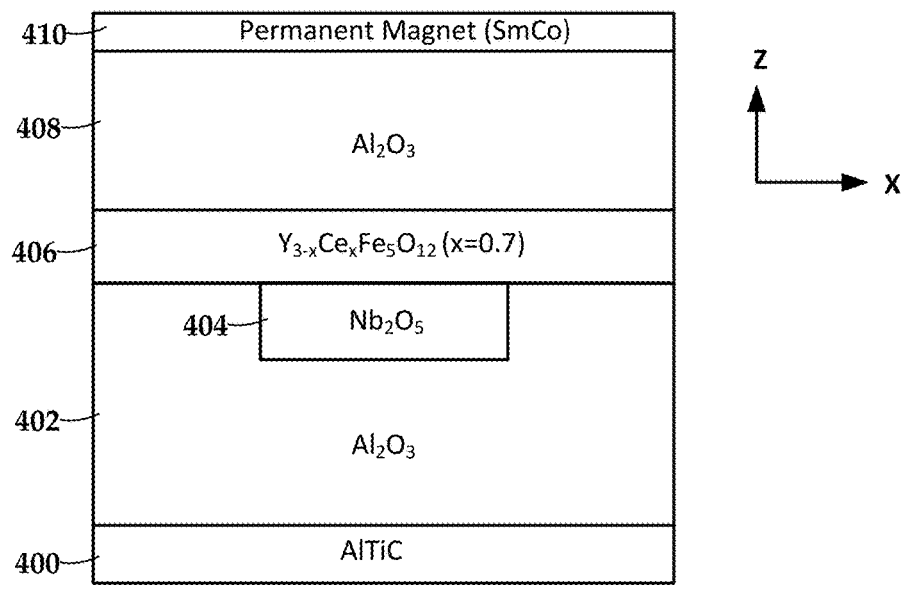
FIG. 4 is a cross-sectional view of a magneto-optical phase shifter according to an example embodiment.

In FIG. 4, a diagram shows a cross-section of an MO phase shifter according to an example embodiment. This view corresponds to section A-A in FIG. 3, and includes a substrate 400, waveguide cladding layers 402, 408, a waveguide core layer 404, a magneto-optical layer 406 proximate the waveguide core layer 404, and a permanent magnet layer 410 on the top waveguide cladding layer 408. The magneto-optical layer 406 includes a Ce-doped yttrium iron garnet, in particular $Y_{3-x}Ce_xFe_5O_{12}$ (x=0.7). This material, as well as the waveguide optical materials in the waveguide core 404 and cladding 402, 408, are suitable for a near-infrared light (e.g., ~830 nm), and different materials may be used for different wavelengths in other embodiments. The permanent magnet layer 410 and magneto-optical layer 406 form a Mach-Zehnder interferometer (MZI). An electromagnet may be used instead of the permanent magnet layer 410, although may involve adding an additional bonding pad on the slider to energize the electromagnet.

The isolator in FIGS. 3 and 4 causes light to experience a different phase shift when going in the forward or backwards directions. This sets up constructive or destructive interference that can enhance the transmitted light components but reduce or block the reflected light components. In reference again to FIG. 3, the phase shifter 314 is designed with phase shift angle (pi such that $\varphi_1 L = \pi/2$ in the forward direction and $\varphi_1 L = \pi/4$ in the backward/reverse direction, where L is the total optical isolator length shown in FIG. 3. The phase shifter 316 is designed with phase shift angle $\varphi_2$ such that $\varphi_2 L = \pi/2$ in the forward direction and $\varphi_2 L = \pi/4$ in the backward direction. The relationship between input power $P_{in}$ and output power $P_{out}$ through the optical isolator 300 is given in Equation (1) below. This results in $P_{out} = P_{in}$ in the forward direction and $P_{out} = 0$ in the backward direction.

$$P_{out} = P_{in} = \frac{(1 + \cos(2\varphi_1 L + 2\varphi_2 L))}{2} \quad (1)$$

Figure 5:
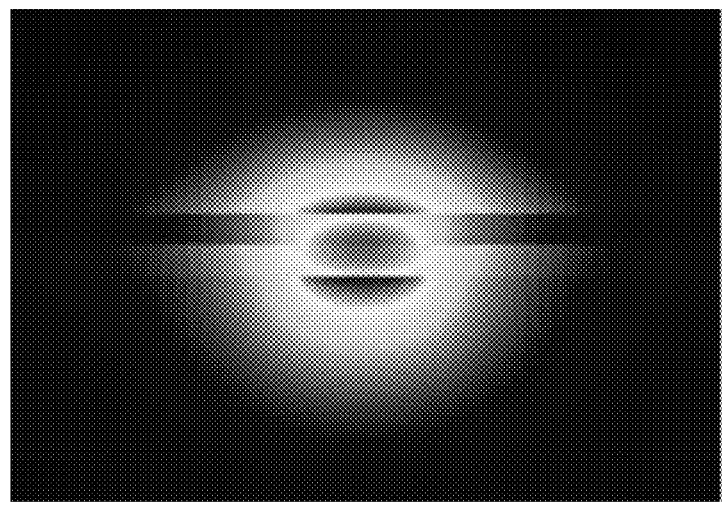
FIG. 5 a plot showing a mode profile of a phase shifter according to an example embodiment.

In one non-limiting embodiment, the layers shown in FIG. 4 have the following dimensions: cladding layers 402, 408: 1000 nm thick (z-direction); core layer 404 90 nm thick and 350 nm wide (x-direction); magneto-optical layer 406: 90 nm thick; and permanent magnet 410: 100 nm thick. As will be described hereinbelow, the width of the material stack may be different for the different phase shifters 314, 316. Some other parameters of interest determined via analysis of the optical isolator 300 include: Faraday rotation of ~22,000 degree/cm for layer 406 at ~830 nm wavelengths; length of the MZI for π phase shift=∞45 μm; layer 406 is magnetized by SmCo permanent magnet along the x-direction; total insertion loss=~3-12 dB for transverse magnetic (TM) mode (depends on film quality of layer 406); isolation is >20 dB for a bandwidth of 15 nm; total footprint of the optical isolator 300=~0.200 mm×0.120 mm; loss=0.07-0.28 dB/μm; effective index ($n_{eff}$) for TM mode coupling=1.80 @ 830 nm wavelength. In FIG. 5, a plot shows a mode profile of the phase shifters 314, 316 based on a simulation using the above noted dimensions and materials.

Figure 6:
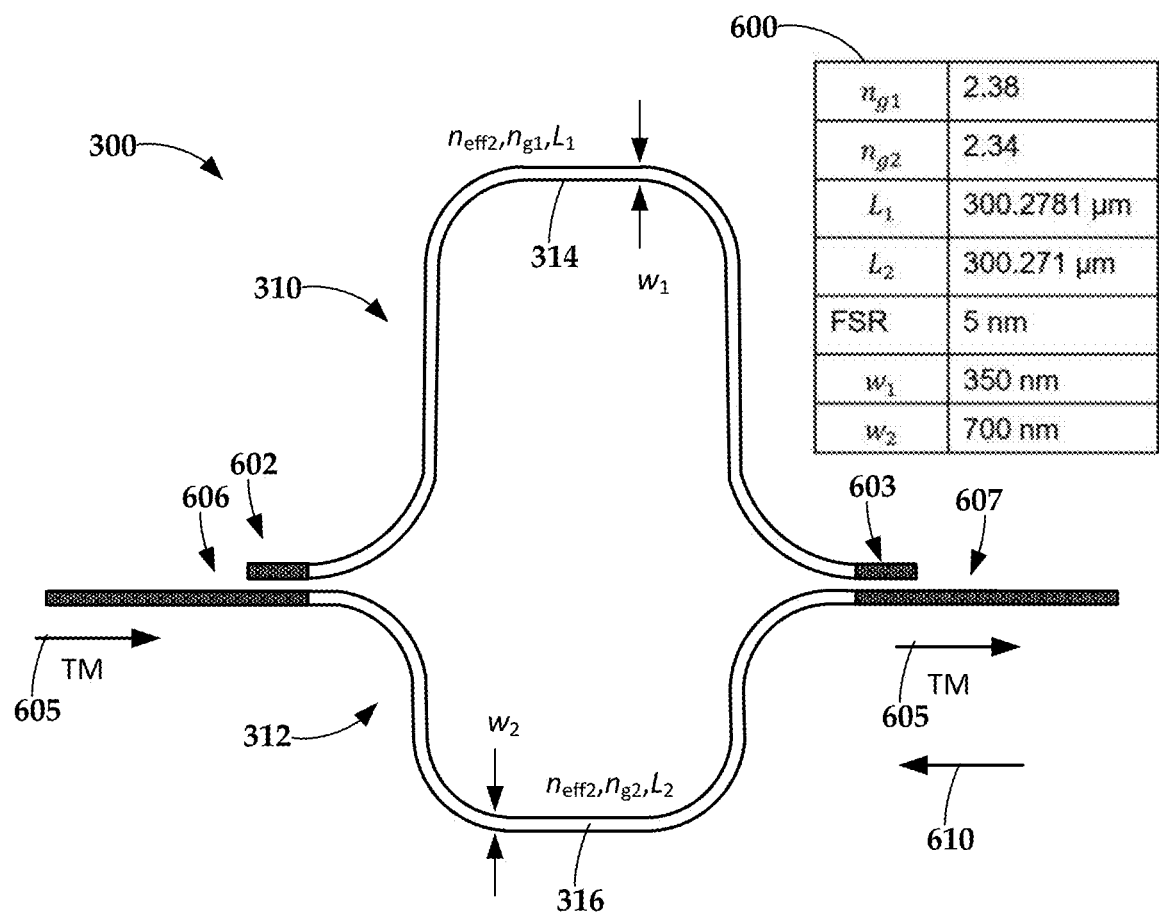
FIG. 6 is a plan view of an optical isolator according to another example embodiment.

In FIG. 6, a diagram of the optical isolator 300 shows optional features that may be included in order to ensure the first and second different optical properties for different components of light have a minimal spectral change with respect to temperature. The two branches 310, 312 have different widths $w_1$ and $w_2$ and different lengths $L_1$ and $L_2$ respectively. The different first and second widths $w_1$ and $w_2$ are selected to minimize a wavelength sensitivity of the optical isolator 300 with respect to temperature change. The free spectral range (FSR) of the branches 310, 312 this arrangement is given in Equation (2) below, where λ is light wavelength, $n_{g1}$ and $n_{g2}$ are the group indices of branches 310, 312 and $L_1$, $L_2$ are the lengths of the branches 310, 312.

$$FSR = \frac{\lambda^2}{n_{g1}L_1 - n_{g2}L_2} \quad (2)$$

The wavelength sensitivity of the optical isolator 300 with respect to temperature change is given in Equation (3), which is set to zero in order to minimize temperature sensitivity of the optical isolator 300. This results in the calculations shown in Equations (4)-(7), which can be used to obtain the branch geometry. Note that Equations (5) and (6) are the temperature sensitivity of effective refractive index of the magneto-optical layer 406 and core 404, respectively. Example dimensions for this optical isolator are shown in the table 600 in FIG. 6. Note that $n_{eff1}$ and $n_{eff2}$ are functions of widths $w_1$ and $w_2$, respectively, and these widths can change to obtain the desired performance. Width of the cladding and magneto-optical material remain constant in these designs.

$$\frac{d\lambda}{dT} = \frac{1}{n_{g1}L_1 - n_{g2}L_2}\left(L_1 \frac{dn_{eff1}}{dT} - L_2 \frac{dn_{eff2}}{dT}\right) = 0 \quad (3)$$

$$L_1\left(\frac{dn_{eff1}}{dT} / \frac{dn_{eff2}}{dT}\right) = L_2 \quad (4)$$

$$\frac{dn_{eff2,Ce:YIG}}{dT} = 9.1 \times 10^{-5} K^{-1} \quad (5)$$

$$\frac{dn_{eff2,Nb_2O_5}}{dT} = 1.43 \times 10^{-5} K^{-1} \quad (6)$$

$$L_2 = \frac{6.36\lambda^2}{FSR(n_{g1} - n_{g2})} \quad (7)$$

Also seen in FIG. 6 are couplers 602, 603 at the input end 606 and output end 607 of the waveguide branches 310, 312. These couplers 602, 603 include wideband multi-mode interferometer (MMI) couplers. Transmitted component of light 605 via the laser (not shown) is input to waveguide branch 312 and coupled to branch 310 via coupler 602 in TM mode. Similarly, transmitted component of light 605 leaving branch 310 is coupled back into branch 312 at output coupler 603, where it is delivered in TM mode to the NFT (not shown). Note that these couplers 602, 603 may operate similarly but in reverse relative to a component of light 610 that propagates in the opposite direction, e.g., reflected light.

Figure 7:
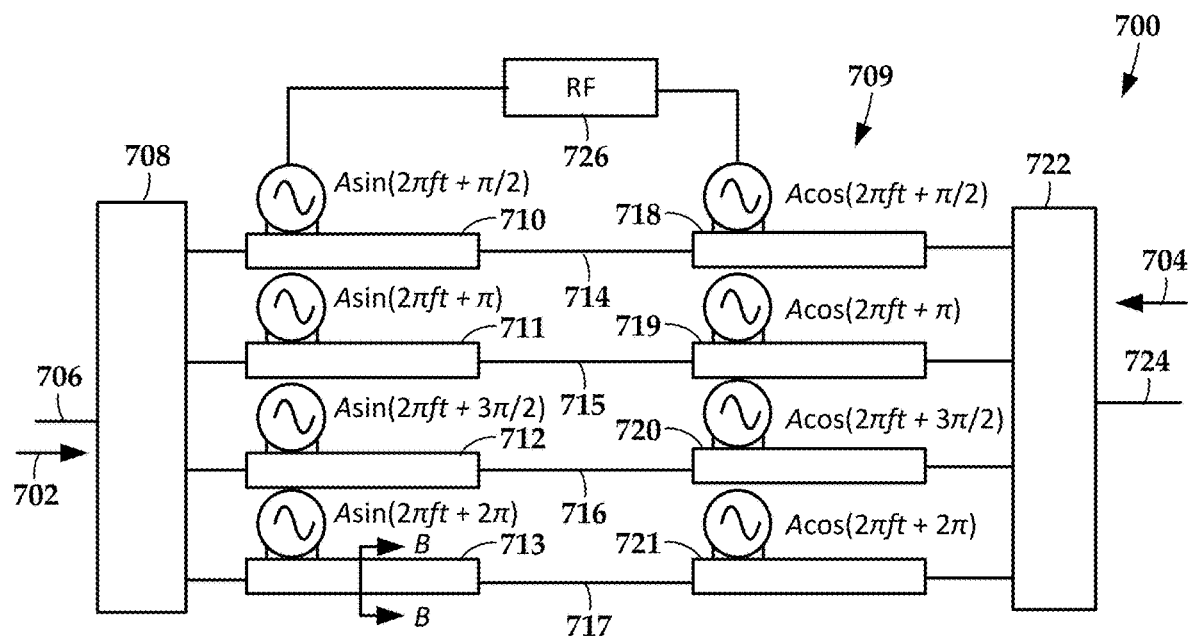
FIG. 7 is a plan view of an optical isolator according to another example embodiment.

In FIG. 7, a diagram shows an optical isolator 700 according to another example embodiment. The optical isolator 700 uses time-dependent index change materials (transparent at 1550 nm) to a give the isolator 700 first optical property with respect to transmitted components 702 of light traveling towards the recording medium and a second optical property with respect to reflected components 704 of the light traveling towards a laser, such that the second optical property suppresses the reflected components 704 of the light. This optical isolator 700 may be used with any slider configuration, but may be best suited to an externally mounted laser configuration (e.g., using energy source 106 shown in FIG. 1).

The optical isolator 700 includes an input waveguide 706 coupled to a low-loss splitter 708. The splitter 708 splits light to a plurality of waveguides 709 (four waveguides in this example) each having a delay lines 714-717 coupled between first phase modulators 710-713 and second phase modulators 718-721. The first and second phase modulators 710-713, 718-721 each shift phase of the modulation by an incrementally different angle (π/2 increments in this example) such that incremental angles of the phase modulators 710-713, 718-721 are distributed between a full rotation angle of 2π. The second phase modulators 718-721 output to a low-loss combiner 722 which is coupled to an output waveguide 724. Note that the functions of the splitter 708 and combiner 722, as well as input and output waveguides 706, 724 will be reversed for the reflected components 704 of light.

Figure 8:
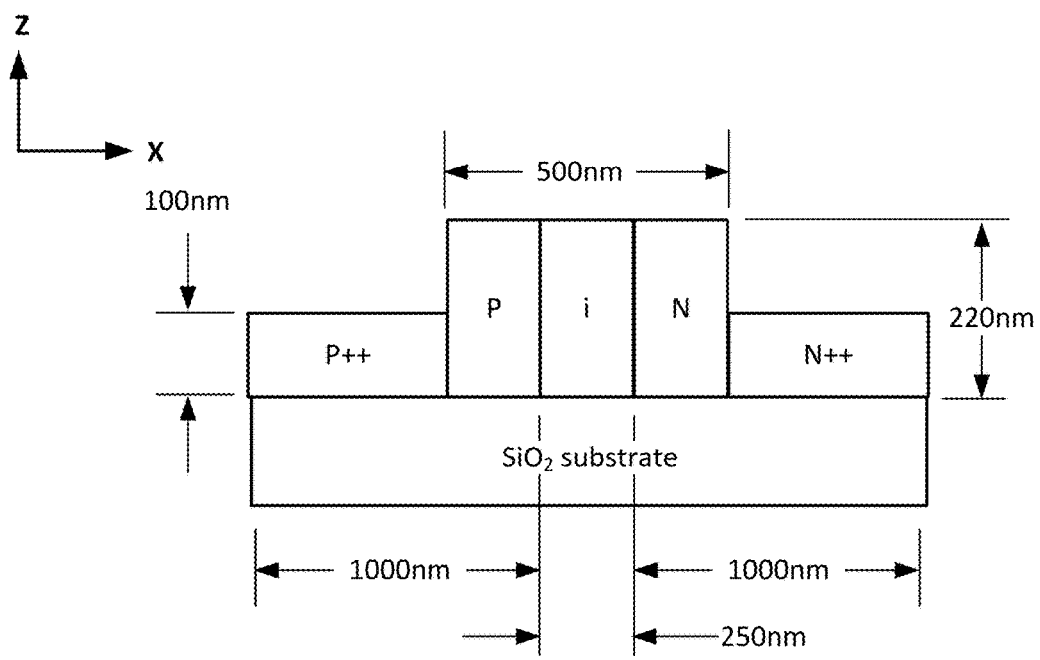
FIG. 8 is a cross-sectional view of a time-varying index change phase shifter according to an example embodiment.

The phase modulators 710-713, 718-721 use doped silicon waveguides with a P-I-N junction as shown in the cross section view of FIG. 8, which corresponds to section B-B of phase modulator 713. Non-limiting examples of dimensions of the phase modulators are also shown in FIG. 8. In reference again to FIG. 7, the recording head employing this isolator 700 will be coupled to variable radio-frequency (RF) drive 726 and timing circuits driving the phase modulators 710-713, 718-721 by applying a modulation signal of frequency f to each arm. The RF drive 726 can form the drive signals to adjust the phase between each arm of the isolator 700.

The delay lines 714-717 have a delay τ, such that if τ=1/(4f), isolation is maximized. The delay in lines 714-717 can be realized by a long low loss waveguide with a group velocity $n_g$. The length of the waveguide in such a case is L=c/(4f$n_g$), where c is the velocity of light. For shorter delay, high frequency of modulation f is needed. Amplitude can be chosen by solving $J_0(2A)=0$. Other parameters of interest for this design are: length of the phase modulators 710-713, 718-721 for a π phase shift≈4 mm; drive voltage for π phase shift≈6V; total insertion loss≈0.4 dB; isolation >30 dB for a 15 nm bandwidth; total footprint≈9.8 mm×0.600 mm; delay length=1.8 mm for f=10 GHz; insertion loss 0.1 dB/cm; group index for TE coupling.

Figure 9:
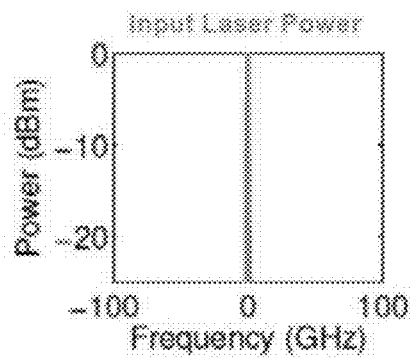
FIGS. 9-11 are graphs is showing the effect of an optical isolator according to an example embodiment.
Figure 11:
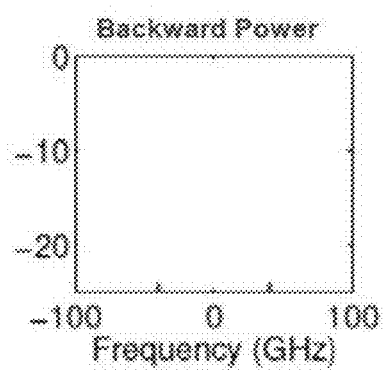
Figure 10:
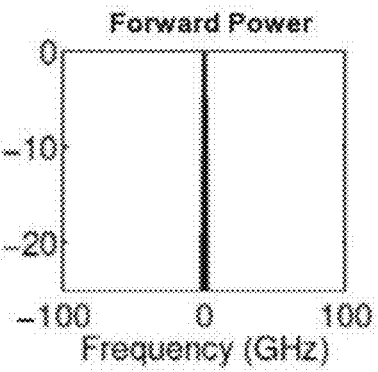
Figure 12:
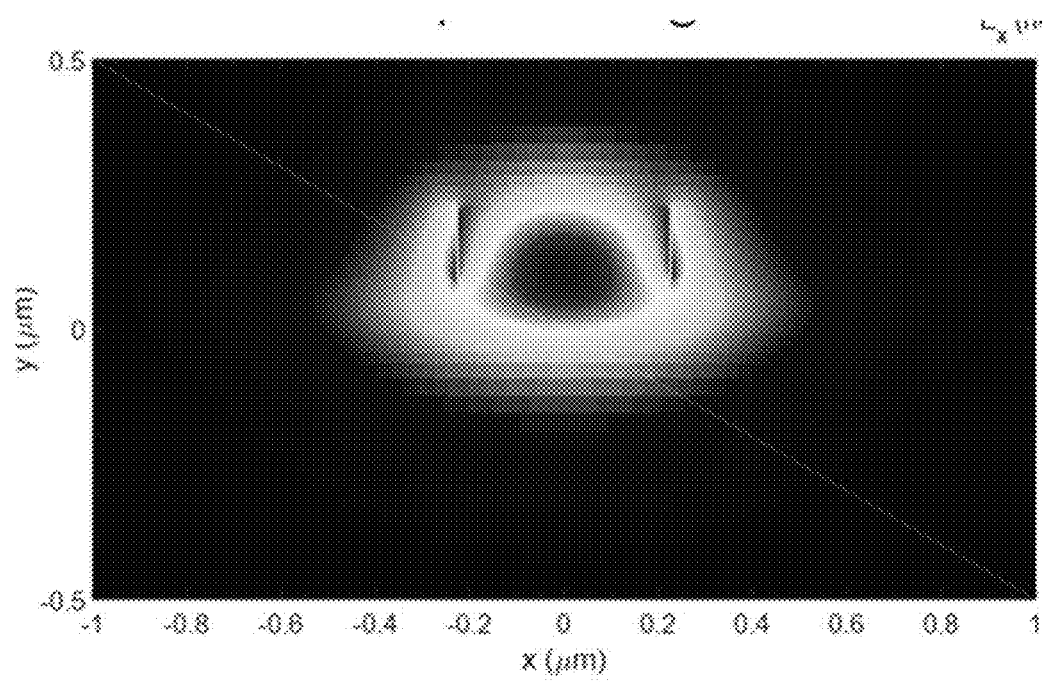
FIG. 12 is a field plot showing a mode shape of a phase modulators according to an example embodiment.

Equations (8) and (9) below are the calculations for forward and backward power in the optical isolator 700. In FIGS. 9-11, graphs show the resulting effect on forward power ($E_{forward}$) and backward (reflected) power ($E_{backward}$). In FIG. 12, a field plot (Ex) shows the mode shape of a phase modulators 710-713, 718-721 according to an example embodiment.

$$E_{forward} = \left| e^{iA\sin(2\pi ft - 2\pi ft + \frac{\pi}{2})} e^{iA\cos(2\pi ft + \frac{\pi}{2})} + \right. \quad (8)$$
$$e^{iA\sin(2\pi ft - 2\pi ft + \pi)} e^{iA\cos(2\pi ft + \pi)} + e^{iA\sin(2\pi ft - 2\pi ft + \frac{3\pi}{2})} e^{iA\cos(2\pi ft + \frac{3\pi}{2})} +$$
$$\left. e^{iA\sin(2\pi ft - 2\pi ft + 2\pi)} e^{iA\cos(2\pi ft + 2\pi)} \right|$$

$$E_{backward} = \left| e^{iA\sin(2\pi ft + \frac{\pi}{2})} e^{iA\cos(2\pi f - 2\pi ft + \frac{\pi}{2})} + \right.$$
$$e^{iA\sin(2\pi ft + \pi)} e^{iA\cos(2\pi ft - 2\pi ft + \pi)} +$$
$$\left. e^{iA\sin(2\pi ft + \frac{3\pi}{2})} e^{iA\cos(2\pi ft - 2\pi ft + \frac{3\pi}{2})} + e^{iA\sin(2\pi ft + 2\pi)} e^{iA\cos(2\pi ft - 2\pi ft + 2\pi)} \right|$$

Note that it may be possible to employ a similar design as shown in FIG. 7 with more or fewer branches. For example, for three branches, each branch would have 2π/3, 4π/3, and 2π shifts, with appropriate changes to the delay lines. The phase shift angles can be induced in a number of ways. One way is to use a custom circuit board driven by a field programmable gate array (FPGA) or the like to drive all the phase shifters independently. This way, any phase shifter can be driven at an arbitrary phase value including the ones proposed in this embodiment. Fixed RF delay lines can be made on the chip that provide a specific value of the delay. For example, a 2π/3 delay can be implemented by a coplanar waveguide of a certain length. 4π/3 delay can be implemented by a coplanar waveguide with twice that length and 2π delay can be implemented with thrice that delay value. However, this method would provide static delay and cannot be tuned once fabricated.

Figure 13:
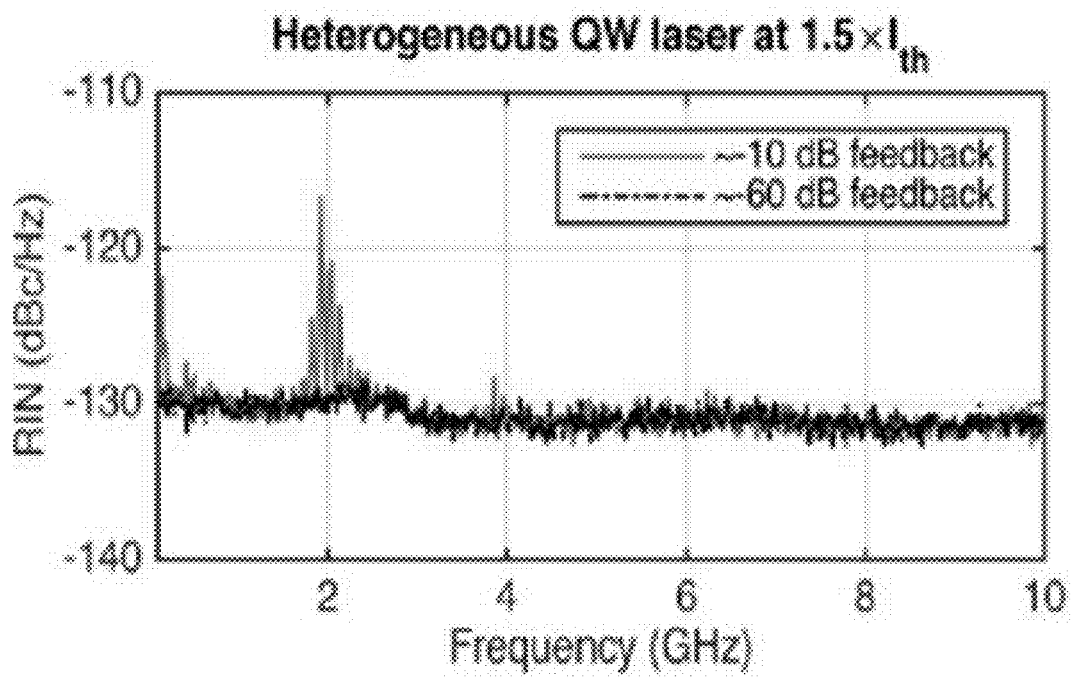
FIGS. 13 and 14 are graphs showing relative intensity noise for a quantum well and a quantum dot laser under different feedback conditions.
Figure 14:
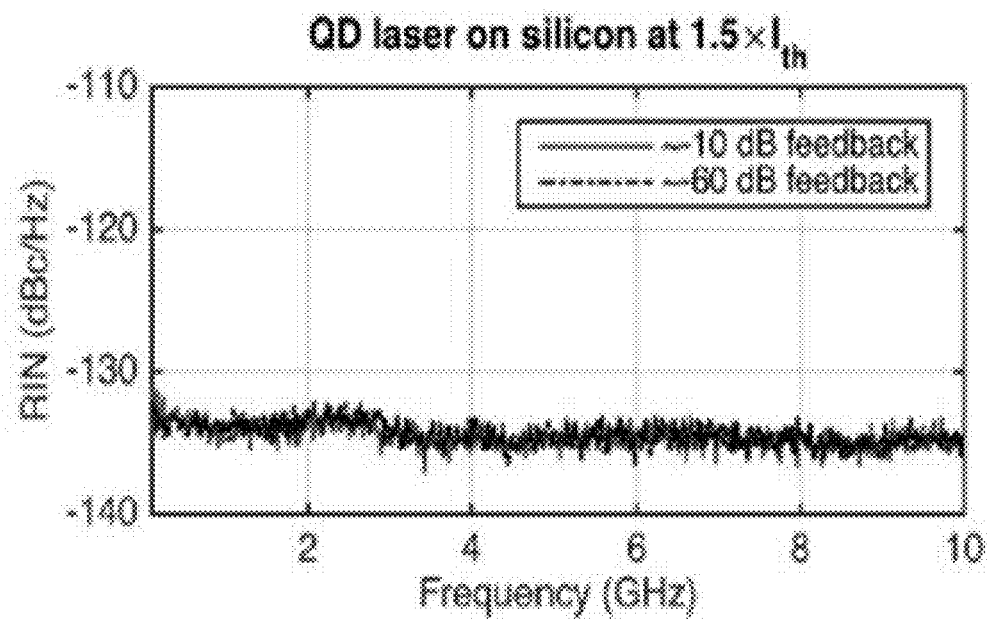

In addition to or instead of optical isolators, laser instability can be addressed in the laser itself. For example, a quantum dot (QD) laser can be used instead of the quantum well (QW) lasers typically used in HAMR drives and similar applications. In one application, a Fabry Perot QD laser at 830 nm can be used. Such device includes growth of the laser material on a silicon wafer and then patterning of the cavity and electrodes. Quantum dot QD lasers are less susceptible to feedback due to low α parameter. In FIGS. 13 and 14, graphs show relative intensity noise (RIN) for a respective QW and QD laser under −10 dB and −60 dB feedback conditions. The QD laser exhibits lower RIN across the spectrum, and the QI) laser does not have the peak seen at ~2 GHz seen for the QW laser.

Figure 15:
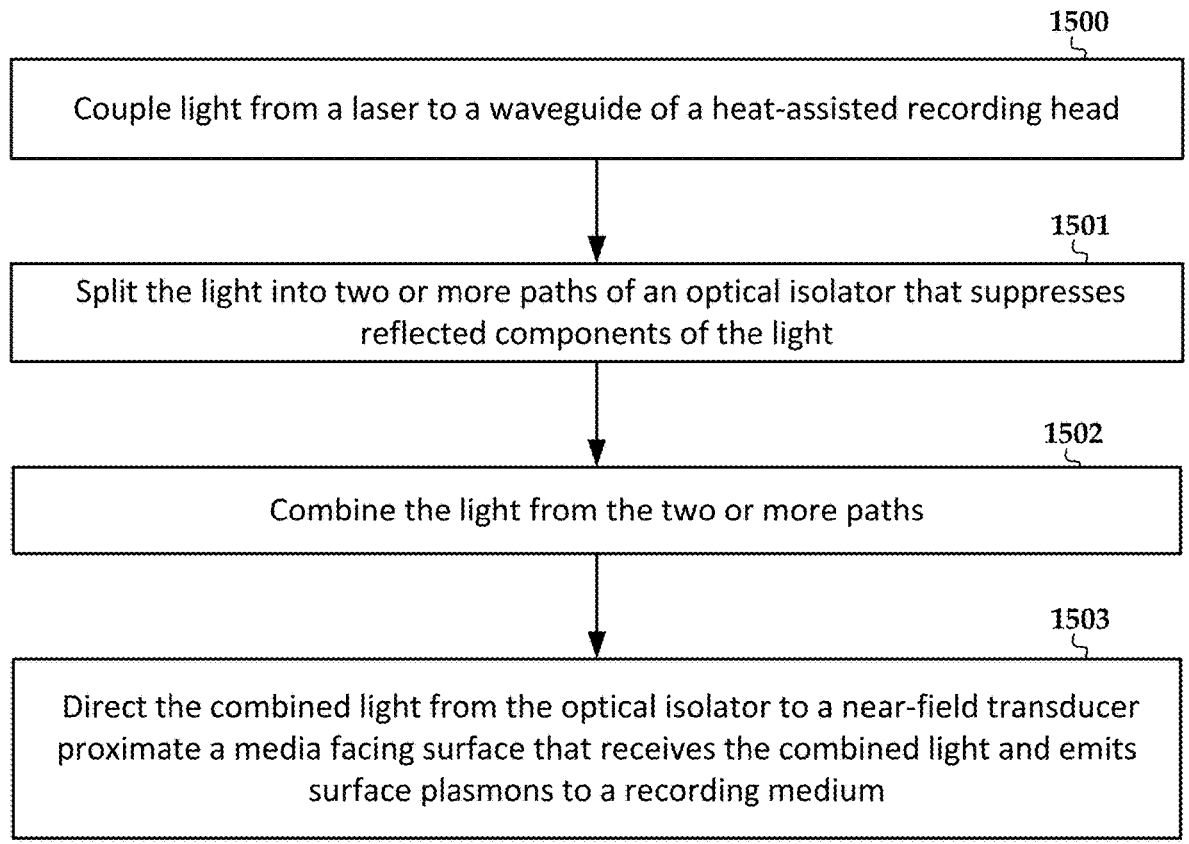
FIG. 15 is a flowchart of a method according to an example embodiment.

In FIG. 15, a flowchart illustrates a method according to an example embodiment. The method involves coupling 1500 light from a laser to a waveguide of a heat-assisted recording head. The light is split 1501 into two or more paths of an optical isolator. The optical isolator has a first optical property with respect to transmitted components of the light traveling towards the recording medium and a second optical property with respect to reflected components of the light traveling towards the laser. The second optical property suppresses the reflected components of the light. The light is combined 1502 from the two or more paths and the combined light is directed 1503 from the optical isolator to a near-field transducer proximate a media facing surface that receives the combined light and emits surface plasmons to the recording medium in response.

Figure 16:
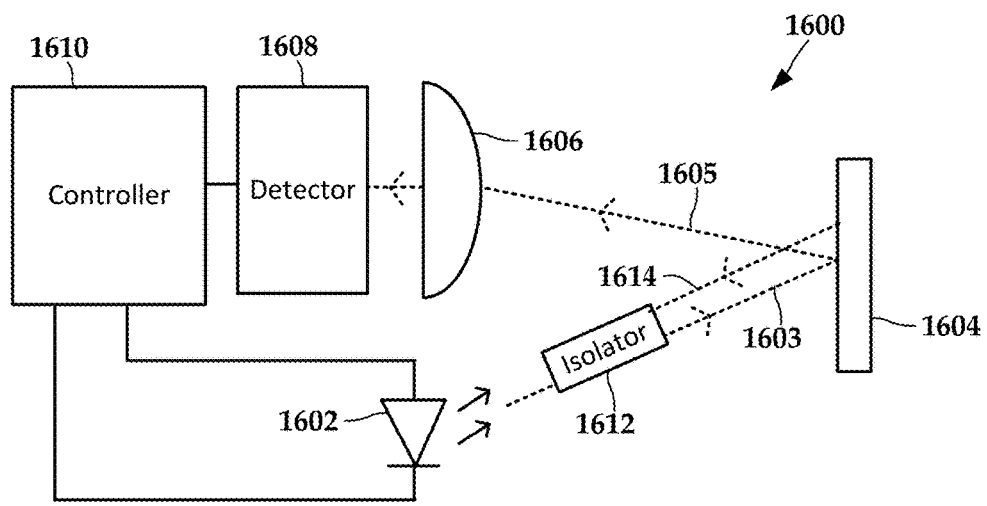
FIG. 16 is a diagram of a LIDAR system according to an example embodiment.

As noted above, an optical isolator according to any of the embodiments above (e.g., FIGS. 3, 4, 6, 7, and/or 8) may be used in a LIDAR system. In FIG. 16, a schematic diagram shows a LIDAR system 1600 according to an example embodiment. The system 1600 includes one or more lasers 1602, here shown as a laser diode. The laser 1602 emits light 1603 that illuminates a target 1604. Reflected light 1605 from the target is collected by collection optics 1606 which directs the collected light to one or more detectors 1608. A controller 1610 is coupled to the detector 1608 and the laser 1602 and generally includes circuits that energize and control the laser 1602 and perform processing on signals provided by the detector 1608 to produce LIDAR data, e.g., point clouds.

An optical isolator 1612 receives the light 1603 emitted from the laser 1602. The optical isolator 1612 has a first optical property with respect to transmitted components of the light traveling towards the target 1604 and a second optical property with respect to reflected components 1614 of the light traveling towards the laser 1602. This can prevent instability of the laser 1602, e.g., due to mode hopping. Note that the system 1600 is simplified and may include other components, such as rotating mirrors, transmission optics, polarizers, filters, etc. The laser 1602 can be externally mounted from the detector 1608 and controller 1610 or integrated with other components on a single chip via bonding, flip-chip, transfer print, etc.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A heat-assisted recording head, comprising:
    a laser that outputs light used to heat a recording medium;
    a near-field transducer proximate a media facing surface that receives the light and emits surface plasmons to the recording medium in response; and
    an optical isolator between the laser and the near-field transducer, the optical isolator comprising two or more light paths that have a first optical property with respect to transmitted components of the light traveling towards the recording medium and a second optical property with respect to reflected components of the light traveling towards the laser, wherein the second optical property suppresses the reflected components of the light.

2. The recording head of claim 1, wherein the two or more light paths comprise a first waveguide branch comprising a first magneto-optical phase shifter and a second waveguide branch comprising a second magneto-optical phase shifter, wherein the first and second optical properties comprise different propagation constants.

3. The recording head of claim 2, wherein the first and second magneto-optical phase shifters comprise a Ce-doped yttrium iron garnet layer proximate a waveguide core and a magnetic layer on a top cladding layer.

4. The recording head of claim 3, wherein the magnetic layer comprises a permanent magnetic material.

5. The recording head of claim 2, wherein the first and second magneto-optical phase shifters have different first and second widths selected to minimize a wavelength sensitivity of the optical isolator with respect to temperature change.

6. The recording head of claim 2, wherein the laser comprises a transfer printed laser formed in a trailing edge of the recording head.

7. The recording head of claim 2, wherein the first and second waveguide branches are coupled at an input end and an output end by respective wideband multi-mode interferometer couplers.

8. The recording head of claim 1, wherein the two or more light paths comprise a plurality of waveguides each having a delay line coupled between first and second phase modulators, wherein the first and phase modulators are driven by a modulation signal to minimize the reflected components of the light, the plurality of waveguides coupled to an input waveguide via a splitter and an output waveguide via a combiner, and wherein the first and second optical properties are time-dependent index changes in the optical isolator.

9. The recording head of claim 8, wherein the plurality of waveguides comprises four waveguides, the first and second phase modulators shifting modulation by an incrementally different phase angle of $\pi/2$ for each of the four waveguides.

10. A method, comprising:
coupling light from a laser to a waveguide of a heat-assisted recording head;
splitting the light into two or more paths of an optical isolator, the optical isolator comprising a first optical property with respect to transmitted components of the light traveling towards a recording medium and a second optical property with respect to reflected components of the light traveling towards the laser, wherein the second optical property suppresses the reflected components of the light; and
combining the light from the two or more paths and directing the combined light from the optical isolator to a near-field transducer proximate a media facing surface that receives the combined light and emits surface plasmons to the recording medium in response.

11. The method of claim 10, wherein the two or more paths comprise a first waveguide branch comprising a first magneto-optical phase shifter and a second waveguide branch comprising a second magneto-optical phase shifter, wherein the first and second optical properties comprise different propagation constants.

12. The method of claim 10, wherein the two or more paths comprise a plurality of waveguides each having a delay line coupled between first and second phase modulators, wherein the phase modulators are driven by a modulation signal to minimize the reflected components of the light, and wherein the first and second optical properties are time-dependent index changes in the plurality of waveguides.

13. A heat-assisted recording head, comprising:
a laser that outputs light used to heat a recording medium;
a near-field transducer proximate a media facing surface that receives the light and emits surface plasmons to the recording medium in response; and
an optical isolator between the laser and the near-field transducer, the optical isolator comprising two or more paths that are coupled via a splitter at an input end and a combiner at an output end, wherein the two or more paths cause constructive light interference in a forward direction towards the near-field transducer and destructive light interference in a backward direction towards the laser.

14. The recording head of claim 13, wherein the two or more paths comprise first and second waveguide branches having respective first and second magneto-optical phase shifters, the first and second magneto-optical phase shifters having different propagating constants in different directions.

15. The recording head of claim 14, wherein the first and second magneto-optical phase shifters each comprise a Ce-doped yttrium iron garnet layer proximate a waveguide core and a magnetic layer on a top cladding layer.

16. The recording head of claim 14, wherein the first and second magneto-optical phase shifters have different first and second widths selected to minimize a wavelength sensitivity of the optical isolator with respect to temperature change.

17. The recording head of claim 14, wherein the laser comprises a transfer printed laser formed in a trailing edge of the recording head.

18. The recording head of claim 14, wherein the first and second waveguide branches are coupled at the input end and the output end by respective wideband multi-mode interferometer couplers.

19. The recording head of claim 13, wherein the two or more paths comprise a plurality of waveguides each having a delay line coupled between first and second phase modulators, wherein the first and second phase modulators are driven by a modulation signal to minimize reflected components of the light that travel from the output end to the input end.

20. The recording head of claim 19, wherein the plurality of waveguides comprises four waveguides, the first and second phase modulators shifting modulation by an incrementally different phase angle of $\pi/2$ for each of the four waveguides.

* * * * *